(12) United States Patent
Kim (10) Patent No.: US 9,735,996 B2
(45) Date of Patent: Aug. 15, 2017

(54) FULLY PARALLEL FAST FOURIER TRANSFORMER

(71) Applicant: ELECTRONICS AND TELECOMMUNICATIONS RESEARCH INSTITUTE, Daejeon (KR)

(72) Inventor: Jin Kyu Kim, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/348,771

(22) Filed: Nov. 10, 2016

(65) Prior Publication Data

US 2017/0149589 A1    May 25, 2017

(30) Foreign Application Priority Data

Nov. 25, 2015  (KR) .................. 10-2015-0165499
May 23, 2016  (KR) .................. 10-2016-0062994

(51) Int. Cl.
*G06F 17/14*  (2006.01)
*H04L 27/26*  (2006.01)
*G06F 9/30*  (2006.01)

(52) U.S. Cl.
CPC .......... *H04L 27/265* (2013.01); *G06F 9/3001* (2013.01); *G06F 17/141* (2013.01); *G06F 17/142* (2013.01)

(58) Field of Classification Search
CPC ..... G06F 17/142; G06F 17/141; G06F 9/3001
See application file for complete search history.

(56) References Cited

U.S. PATENT DOCUMENTS 6,304,887 B1 * 10/2001 Ju ..................... G06F 9/3001
                                                    708/404
8,477,799 B2    7/2013 Hwang et al.
(Continued)

FOREIGN PATENT DOCUMENTS

KR  10-2004-0046478 A   6/2004
KR  10-2007-0049091 A   5/2007
(Continued)

OTHER PUBLICATIONS

Gokhan Polat et al., "Design and Implementation of 256-Point Radix-4 100 Gbit/s FFT Algorithm into FPGA for High-Speed Applications", ETRI Journal, Aug. 2015, pp. 667-676, vol. 37, No. 4, http://dx.doi.org/10.4218/etrij.15.0114.0678.

*Primary Examiner* — Ross Varndell (57) ABSTRACT

Provided is a fully parallel fast Fourier transformer of N-point, where N is a natural number, including a bit-reversal arranging block configured to rearrange an order of N input complex number samples, a plurality of first processors configured to perform, in a plurality of group units, a 16-point FFT on the rearranged complex number samples, a twiddle factor multiplier configured to multiply outputs of the plurality of first processors by twiddle factors, a first group rearranging block configured to rearrange outputs of the twiddle factor multiplier in the plurality of group units, a plurality of second processors configured to perform, in the plurality of group units, 16-point FFT on the complex number samples grouped by the first group rearranging block, and a second group rearranging block configured to rearrange outputs of the plurality of second processors to output under a same arrangement criterion as the first group rearranging block.

12 Claims, 8 Drawing Sheets

(56) References Cited

U.S. PATENT DOCUMENTS

| | | | |
|---|---|---|---|
| 2001/0051967 A1* | 12/2001 | Jaber | G06F 17/142 |
| | | | 708/403 |
| 2010/0011043 A1* | 1/2010 | Pu | G06F 17/142 |
| | | | 708/404 |
| 2012/0166508 A1 | 6/2012 | Kim et al. | |

FOREIGN PATENT DOCUMENTS

| | | |
|---|---|---|
| KR | 10-2009-0127462 A | 12/2009 |
| KR | 10-2012-0072226 A | 7/2012 |
| KR | 10-2014-0142927 A | 12/2014 |

\* cited by examiner

Complex Number Multiplier for W(1)

FIG. 6B

Complex Number Multiplier for W(2)

FIG. 6C

Complex Number Multiplier for W(3)

FIG. 6D

Complex Number Multiplier for W(4)

FIG. 6E

Complex Number Multiplier for W(6)

FIG. 6F

Complex Number Multiplier for W(9)

US 9,735,996 B2

FULLY PARALLEL FAST FOURIER TRANSFORMER

CROSS-REFERENCE TO RELATED APPLICATIONS

This U.S. non-provisional patent application claims priority under 35 U.S.C. §119 of Korean Patent Application No. 10-2015-0165499, filed on Nov. 25, 2015, and Korean Patent Application No. 10-2016-0062994, filed on May 23, 2016 the entire contents of which are hereby incorporated by reference.

BACKGROUND

The present disclosure herein relates to an electronic device, and more particularly, to a fully parallel fast Fourier transformer used in an orthogonal frequency-division multiplexing system (OFDM) for fast optical communication.

Due to various advantages, the wide use of an OFDM scheme is a trend in a broadcast system, a wireless transmission/reception system, and a wired transmission/reception system such as an optical communication system. In an OFDM modulation/demodulation scheme, a fast Fourier transformer is a very important element.

A method for designing a fast Fourier transformer is very diversified but divided largely into a scheme formed of a single memory and a pipeline scheme formed of a plurality of memories and a plurality of processors. The scheme using the single memory uses an architecture including a radix-r processor and the single memory having the N-word size corresponding to the length of fast Fourier transform (FFT). For the case where the single memory is used, an in-place algorithm is required to be used. In an in-place scheme, a single memory having an address size as long as the length of FFT is given. In addition, data is read at a specific address, subjected to a radix-r operation and then stored again in a memory space having the same address. Since such an operation uses a single radix-r operator, the entire operation time increases with the length of FFT and the number of stages. However, the use of the single radix-r operator has an advantage in terms of the circuit size. The architecture based on the single memory is advantageous in a low hardware cost and easiness of low power implementation. Such an FFT architecture is suitable for an application field requiring a relative small bandwidth and a low throughput.

The pipeline FFT scheme configured of a plurality of processors is a scheme in which there are a plurality of radix-r processors having buffers between processors and memories are respectively inserted between the radix-r processors. In the pipeline FFT scheme, the entire architecture is configured of a plurality of stages that are coupled in series to each other. Each stage is provided with a unique radix-r processor and includes a separate buffer for storing data. Accordingly, since each stage may operate independently in the pipeline FFT scheme, a plurality of radix-r operations may be simultaneously performed. Accordingly, the pipeline FFT scheme is the same as the in-place scheme in terms of memory use, but a throughput thereof is much higher than that of the in-place scheme since radix-r operations are performed simultaneously at respective stages. The pipeline FFT scheme provides a high throughput but is disadvantageous in that the hardware size becomes large, since the plurality of radix-r processors are required to be maintained. Accordingly, the pipeline FFT scheme is proper to an application field such as WLAN or LTE which requires fast processing.

In optical communication requiring a very high throughput for data transmission of 100 Gbps, a faster processing architecture than the pipeline FFT scheme is necessary. In order to achieve such a fast processing requirement, an FFT architecture having an arrangement scheme or a fully parallel architecture is being proposed. In such an architecture, FFT input samples are required to be input at the same time to be processed, and then output at the same time. However, since a very large number of hardware resources are necessary for this fully parallel architecture internally, optimization should be accompanied in terms of hardware area.

SUMMARY

The present disclosure provides an efficient fully parallel architecture providing a fast Fourier transform (FFT) data flow for minimizing an FFT hardware area.

The present disclosure also provides a method for reducing the number of internally used complex number multipliers and minimizing the entire area thereof.

An embodiment of the inventive concept provides a fully parallel fast Fourier transformer of N-point, where N is a natural number, the fully parallel fast Fourier transformer including: a bit-reversal arranging block configured to rearrange an order of N input complex number samples; a plurality of first processors configured to perform, in a plurality of group units, a 16-point fast Fourier transform (FFT) on the rearranged complex number samples; a twiddle factor multiplier configured to multiply outputs of the plurality of first processors by twiddle factors; a first group rearranging block configured to rearrange outputs of the twiddle factor multiplier in the plurality of group units; plurality of second processors configured to perform, in the plurality of group units, 16-point FFT on the complex number samples grouped by the first group rearranging block; and a second group rearranging block configured to rearrange outputs of the plurality of second processors to output under a same arrangement criterion as the first group rearranging block.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the present invention will be described in detail with reference to the accompanying drawings so that the present invention can be easily realized by those skilled in the art.

Figure 1:
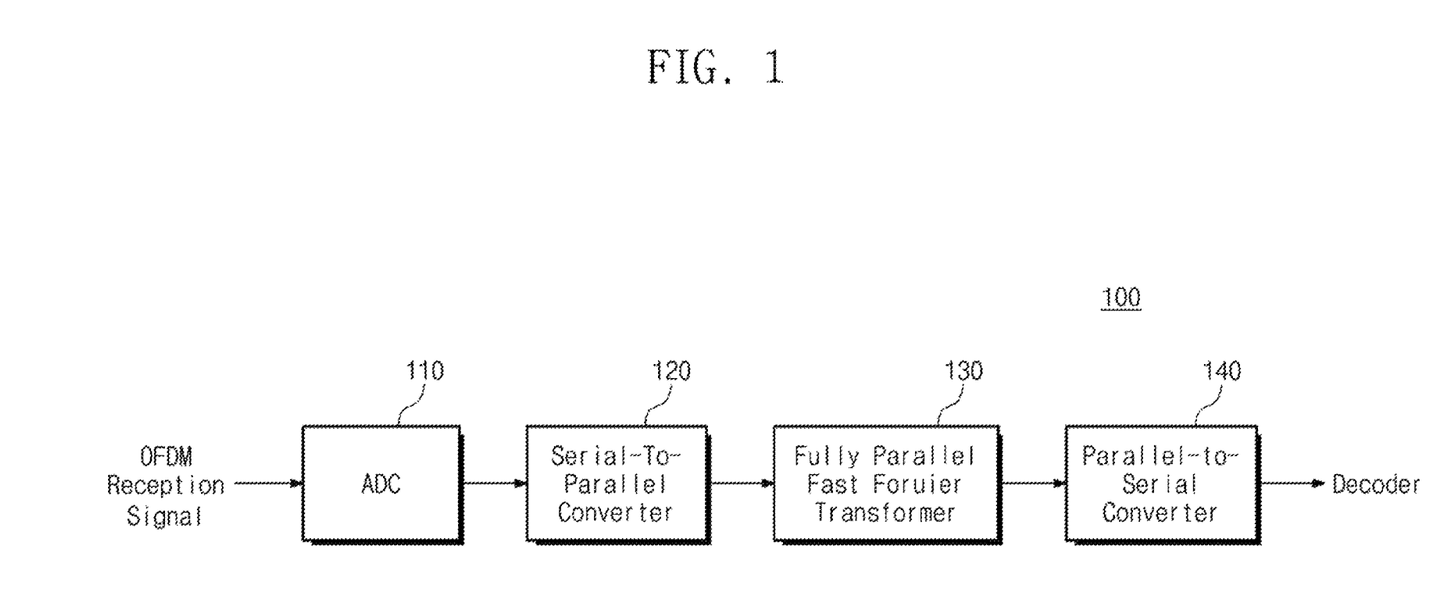
FIG. 1 is a block diagram showing a receiver of an orthogonal frequency division multiplexing (OFDM) system according to an embodiment of the inventive concept.

FIG. 1 is a block diagram showing a receiver of an orthogonal frequency division multiplexing (OFDM) system according to an embodiment of the inventive concept. Referring to FIG. 1, an OFDM receiver 100 may include an analog-to-digital converter (ADC) 110, a serial-to-parallel converter 120, a fully parallel fast Fourier transformer 130, and a parallel-to-serial converter 140.

The ADC 110 performs sampling on an OFDM reception signal at a specific period and outputs the samples in a digital data format. Here, the OFDM reception signal, which is an input signal, may be, for example, an optical signal transmitted through an optical fiber as in an optical OFDM system. However, it will be well understood that the OFDM reception signal may be a reception signal of various OFDM systems as well as the optical signal. The OFDM reception signal may be a baseband analog signal that is converted from the optical signal, which has been received through the optical fiber, by an optical down-converter (not shown). The down-converted OFDM reception signal in the baseband may be further filtered through a low pass filter. In addition, the OFDM reception signal is an analog signal from which aliasing generated by multi-carriers is removed. Such an analog signal is converted into a digital data type by the ADC 110. For the optical OFDM, the analog signal may be classified according to polarization components to be converted into digital data.

The serial-to-parallel converter 120 performs a serial-to-parallel converting operation on a data sequence provided from the ADC 110. The serial-to-parallel converter 120 may re-arrange the serial data sequence sampled by the ADC 110 by an N-point FFT block unit. Here, after the paralleling process, a plurality of N-point FFT blocks may be sequentially output at the same time interval as sampling in a Nyquist frequency to be provided to the fully parallel fast Fourier transformer 130.

The fully parallel fast Fourier transformer 130 may perform an N-point FFT operation on symbols of the N-point FFT block unit. The N-point FFT block provided as time domain data by the N-point FFT operation may be converted to frequency domain data. The fully parallel fast Fourier transformer 130 may include an FFT processor of a fully parallel architecture available for high-speed communication at 100 Gbps or higher. In particular, in the fully parallel Fourier transformer 130, all twiddle factor multiplication operations for phase-shifting may be realized with constant multipliers. Accordingly, the fully parallel fast Fourier transformer 130 may be designed to have a modified radix-16 architecture of the inventive concept for reducing hardware complexity and cost.

The fully parallel fast Fourier transformer 130 of the inventive concept may achieve a high throughput despite of low hardware complexity and may be realized such that a delay time from an input to an output is within 8 clock cycles. In addition, the number of multipliers used for the fully parallel fast Fourier transformer 130 may be optimized and provided in an architecture for dramatically reducing a hardware cost. The architecture of fully parallel fast Fourier transformer 130 will be described with reference to the accompanied drawings.

The parallel-to-serial converter 140 recovers, into serial data, the parallel-processed frequency domain data provided from the fully parallel fast Fourier transformer 130.

The OFDM receiver 100 according to the above-described embodiment of the inventive concept may include an FFT device capable of greatly reducing a hardware cost by minimizing the use of a complex number multiplier, which occupies a large part of the entire hardware size. Accordingly, a fast Fourier transformer, which requires processing at 25 G-samples/s or higher, may be provided in a low cost.

Figure 2:
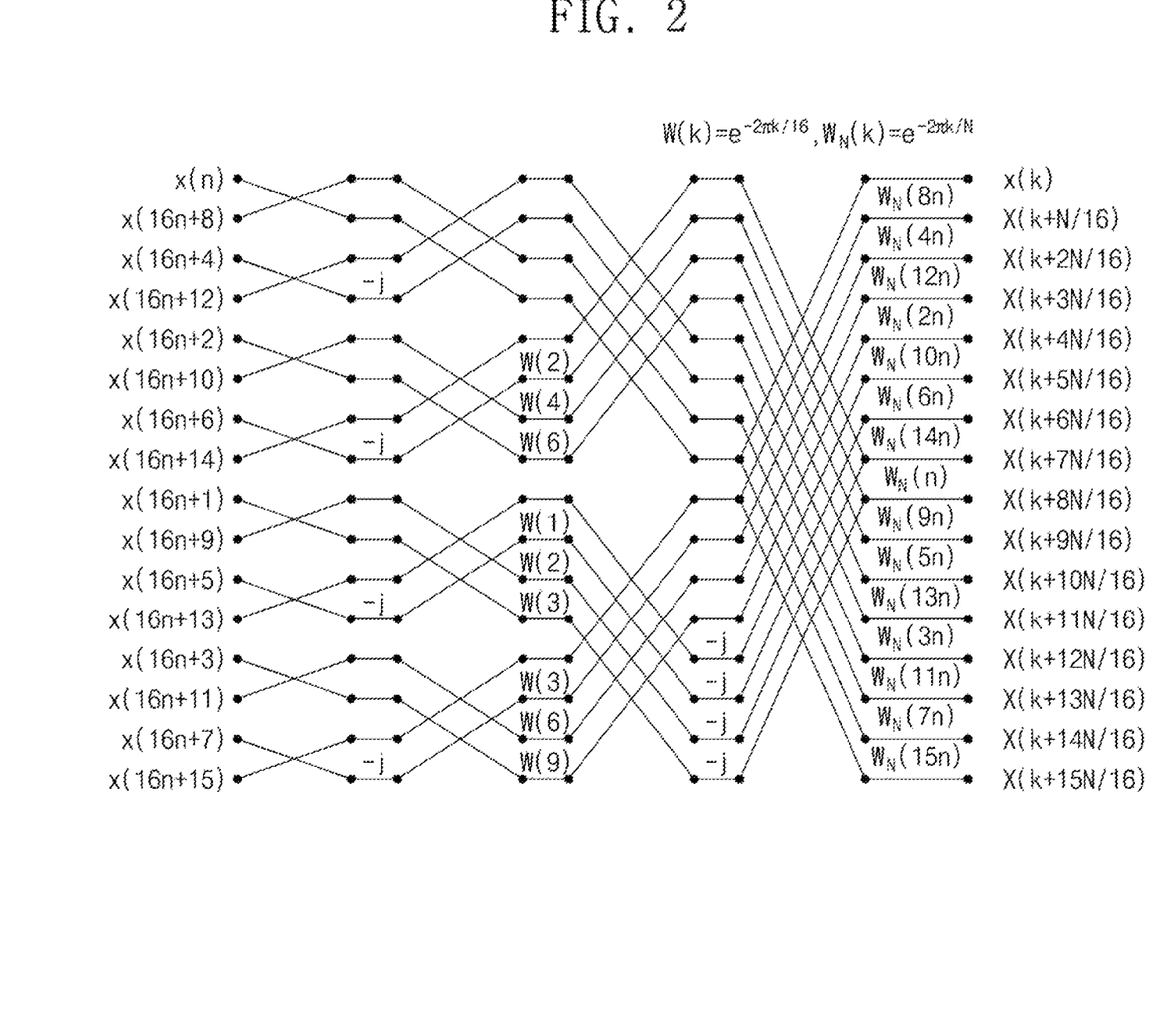
FIG. 2 is a signal flowchart showing an operation of a radix-16 fast Fourier transform (FFT) processor according to an embodiment of the inventive concept.

FIG. 2 is a signal flowchart showing an operation of a radix-16 FFT processor according to an embodiment of the inventive concept. Referring to FIG. 2, the fully parallel fast Fourier transformer 130 of the inventive concept may be realized using a plurality of radix-16 FFT processors. Firstly, an equation for explaining a discrete Fourier transform (DFT) operation of the inventive concept is derived for explaining an operation of the radix-16 FFT processor.

Typical DFT may be expressed at the following Equation (1).

$$X(k) = \sum_{n=0}^{N-1} x(n) W_N^{nk}, k = 0, \ldots, N-1 \text{ where } W_N^{nk} = e^{\frac{-j2\pi nk}{N}} \quad (1)$$

where $W_N$ denotes a twiddle factor, n denotes a time index, and k denotes a frequency index.

In order to simplify calculation complexity, the N-point DFT equation may be expressed as the following Equation (2) for dividing the calculation with a plurality of radix-16 processors.

$$n = \frac{N}{2} n_1 + \frac{N}{4} n_2 + \frac{N}{8} n_3 + \frac{N}{16} n_4 + n_5 \quad (2)$$

where $n_1 = \{0, 1\}, n_2 = \{0, 1\}, n_3 = \{0, 1\}$, $$n_4 = \{0, 1\}, n_5 \left\{0, 1, \ldots, \frac{N}{16} - 1\right\}$$

$$k = k_1 + 2k_2 + 4k_3 + 8k_4 + 16k_5$$

where $k_1 = \{0, 1\}, k_2 = \{0, 1\}, k_3 = \{0, 1\}$, $$k_4 = \{0, 1\}, k_5 = \left\{0, 1, \ldots, \frac{N}{16} - 1\right\}$$

where a variable n is divided into $n_1$ to $n_5$ and a variable k is divided into $k_1$ to $k_5$ according to a common factor algorithm.

When the variables n and k in Equation (2) is applied to Equation (1), Equation (3) may be derived.

$$X(k_1 + 2k_2 + 4k_3 + 8k_4 + 16k_5) = \quad (3)$$

$$\sum_{n_5=0}^{N/16-1} \sum_{n_4=0}^{1} \sum_{n_3=0}^{1} \sum_{n_2=0}^{1} \sum_{n_1=0}^{1} x\left(\frac{N}{2} n_1 + \frac{N}{4} n_2 + \frac{N}{8} n_3 + \frac{N}{16} n_4 + n_5\right) \cdot$$

$$W_N^{(\frac{N}{2} n_1 + \frac{N}{4} n_2 + \frac{N}{8} n_3 \frac{N}{16} n_4 + n_5)(k_1 + 2k_2 + 4k_3 + 8k_4 + 16k_5)} =$$

$$\sum_{n_5=0}^{N/16-1} \sum_{n_4=0}^{1} \sum_{n_3=0}^{1} \sum_{n_2=0}^{1} \sum_{n_1=0}^{1} x\left(\frac{N}{2} n_1 + \frac{N}{4} n_2 + \frac{N}{8} n_3 + \frac{N}{16} n_4 + n_5\right) \cdot$$

$$W_2^{n_1 k_1} W_4^{n_2(k_1 + 2k_2)} W_8^{n_3(k_1 + 2k_2 + 4k_3)}$$

$$W_{16}^{n_4(k_1 + 2k_2 + 4k_3 + 8k_4)} W_N^{n_5(k_1 + 2k_2 + 4k_3 + 8k_4)} W_{N/16}^{n_5 k_5} =$$

$$\sum_{n_5=0}^{N/16-1} \left[ \sum_{n_4=0}^{1} \left\{ \sum_{n_3=0}^{1} \left\{ \sum_{n_2=0}^{1} \left( \sum_{n_1=0}^{1} x\left(\frac{N}{2} n_1 + \frac{N}{4} n_2 + \frac{N}{8} n_3 + \right.\right.\right.\right.\right.$$

$$\left.\left.\left.\left.\left.\frac{N}{16} n_4 + n_5\right) W_2^{n_1 k_1} \right) \cdot W_4^{n_2(k_1 + 2k_2)} \right\} \right] \right\}.$$

-continued $$\left. W_8^{n_3(2k_2+4k_3)} \right\} \cdot W_{16}^{n_4(k_1+2k_2+4k_3+8k_4)} \right].$$

$$W_N^{n_5(k_1+2k_2+4k_3+8k_4)} W_{N/16}^{n_5 k_5} =$$

$$\sum_{n_5=0}^{N/16-1} \left[ \sum_{n_4=0}^{1} \left\{ \sum_{n_3=0}^{1} \left( \sum_{n_2=0}^{1} \left\{ \sum_{n_1=0}^{1} x \left( \frac{N}{2} n_1 + \frac{N}{4} n_2 + \frac{N}{8} n_3 + \right. \right. \right. \right. \right.$$

$$\left. \left. \left. \left. \frac{N}{16} n_4 + n_5 \right) W_2^{n_1 k_1} \right\} \cdot W_4^{n_2 k_1} W_2^{n_2 k_2} \right\} \cdot$$

$$W_8^{n_3(k_1+2k_2)} W_{16}^{n_4(k_1+2k_2)} W_2^{n_3 k_3} \right\} \cdot W_4^{n_4 k_3}$$

$$W_2^{n_4 k_4} \left| W_N^{n_5(k_1+2k_2+4k_3+8k_4)} W_{N/16}^{n_5 k_5} \right.$$

Referring to Equation (3), $n_1$ to $n_5$ may be formed of radix-2 butterfly units. In addition, twiddle factor values, which are applied in respective operation stages from $n_1$ to $n_5$, may be expressible with $n_m$ and $k_m$. Here, m indicates an internal stage index. When a radix-$2^4$ Fourier transform equation is derived with reference to Equation (3), an FFT flowchart as illustrated in FIG. 2 may be obtained.

Referring to FIG. 2 again, a 16-point FFT butterfly operation may be performed by 4 stages. Each stage may be configured from 8 butterfly operating units. In each stage, a butterfly operation between points is performed with a method of Equation (3) as described above.

According to a radix-16 FFT operation as illustrated, input data [x(n) to x(16n+15)] is sequentially processed through 4 (=$\log_2$ 16) operation stages to be output as output data [X(k) to X(k+15N/16)]. Each piece of input data [x(n) to x(16n+15)] may have the width of a plurality of bits.

In first and third stages, a twiddle factor W(4) is necessary, and in a second stage, twiddle factors W(1), W(2), W(3), W(4), W(6), and W(9) may be used. The number of complex number multipliers may be determined by the twiddle factors provided in plurality. In particular, in the radix-16 FFT operation, a complex number multiplier may be realized only with a sign inverter, since the twiddle factor W(4) is multiplied by (−j). Such a structure will be described in detail in relation to FIG. 4.

Figure 3:
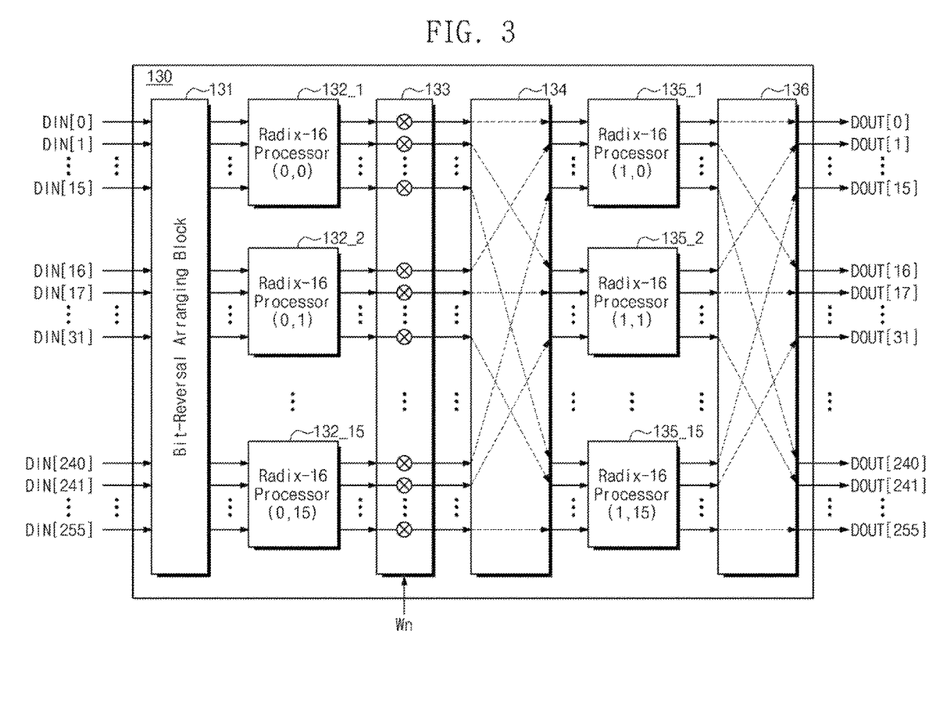
FIG. 3 is a block diagram showing an architecture of a 256-point fully parallel fast Fourier transformer according to an embodiment of the inventive concept.

FIG. 3 is a block diagram showing an architecture of a 256-point fully parallel fast Fourier transformer according to an embodiment of the inventive concept. Referring to FIG. 3, the fully parallel fast Fourier transformer 130 includes a bit-reversal arranging block 131, a first processor block 132, a twiddle factor multiplying block 133, a first group rearranging block 134, a second processor block 135, and a second group rearranging block 136. An operation of the fully parallel fast Fourier transformer 130 will be described as the following.

The bit-reversal arranging block 131 may rearrange an order of input complex number samples. When 256 complex number samples DIN[0] to DIN[255] are input at the same time, the bit-reversal arranging block 131 changes the order of the complex number samples DIN[0] to DIN[255] into a bit-reversed order to deliver the order-changed sample array to the first processor block 132. For example, it is assumed that the complex number samples DIN[0] to DIN[255] are input in a sequence of an order {0, 1, 2, ..., 255}. Then, the bit-reversal block 131 reverses binary values of the input sequence. For example, the sequence expressed with binary values may be considered as {00000000, 00000001, 00000010, 00000011, ..., 11111111}. When the bit-reversal arrangement is performed, the order of the input complex number samples is rearranged into {00000000, 10000000, 01000000, 11000000, ..., 11111111}. In other words, the complex number samples DIN[0] to DIN[255] are output in the order of {0, 128, 64, ..., 255} by the bit-reversal arranging block 131.

The first processor block 132 receives the complex number samples DIN[0] to DIN[255] output according to the bit-reversed order. In other words, the order-rearranged complex number samples DIN[0] to DIN[255] are grouped in a 16 sample unit. In addition, the complex number samples DIN[0] to DIN[255] divided into 16 groups are input for each group to 16 radix-16 processors 132_1 to 132_16 included in the first processor block 132.

Each of the radix-16 processors 132_1 to 132_16 performs a 16-point FFT operation on 16 complex number samples. The 16-point FFT operations for respective radix-16 processors will be described in detail through FIGS. 4 and 5. Each of the radix-16 processors 132_1 to 132_16 includes 8 complex number multipliers, 64 adders, and 20 typical multipliers according to an FFT procedure of the inventive concept. Advantages thereof will be described with reference to the drawings. Data output after the 16-point FFT operation are performed by 16 radix-16 processors 132_1 to 132_16, output may be uniformly input to the twiddle factor multiplying block 133.

The twiddle factor multiplying block 133 multiplies respective result values output from the first processor block 132 by twiddle factors Wn. Since the twiddle factors are provided as complex numbers, the twiddle factor multiplying block 133 may be formed of 256 complex number multipliers. Data obtained by performing twiddle factor multiplying operations is delivered to the first group rearranging block 134.

The first group rearranging block 134 performs a group rearranging operation for rearranging samples in groups, which are allocated to each of the radix-16 processors 132_1 to 132_16. In other words, the first group rearranging block 134 has an architecture in which 16-point FFT outputs of a single group are distributed one by one to 16 groups.

The sample groups rearranged by the first group rearranging block 134 are re-provided 16 samples in 16 group units to the second processor block 135. Each of the 16 radix-16 processors 135_1 to 135_16 of the second processor blocks 135 performs fully parallel FFT operations on the input complex number samples at the same time.

The second group rearranging block 136 performs a group rearranging operation for rearranging samples in group units, which are allocated to each of the radix-16 processors 135_1 to 132_16. In other words, the second group rearranging block 136 has an architecture in which 16-point FFT outputs of a single group are distributed one by one to 16 groups. Data rearranged by the second group rearranging block 136 is output as 256 output samples DOUT[0] to DOUT[255].

As described with reference to FIG. 3, the bit-reversal arranging block 131, the first group rearranging block 134, and the second group rearranging block 136 may be sufficiently realized only with interconnections without addition of separate operating elements. Accordingly, hardware implementation of the bit-reversal arranging block 131, the first group rearranging block 134, and the second group rearranging block 136 does not require a special chip area or a hardware area. In reality, parts occupying a large hardware area are 32 radix-16 processors 132_1 to 132_16 and 135_1 to 135_16 and the twiddle factor multiplying block 133. The radix-16 processor according to an embodiment of the inventive concept may provide an optimal hardware area use efficiency in this architecture.

Figure 4:
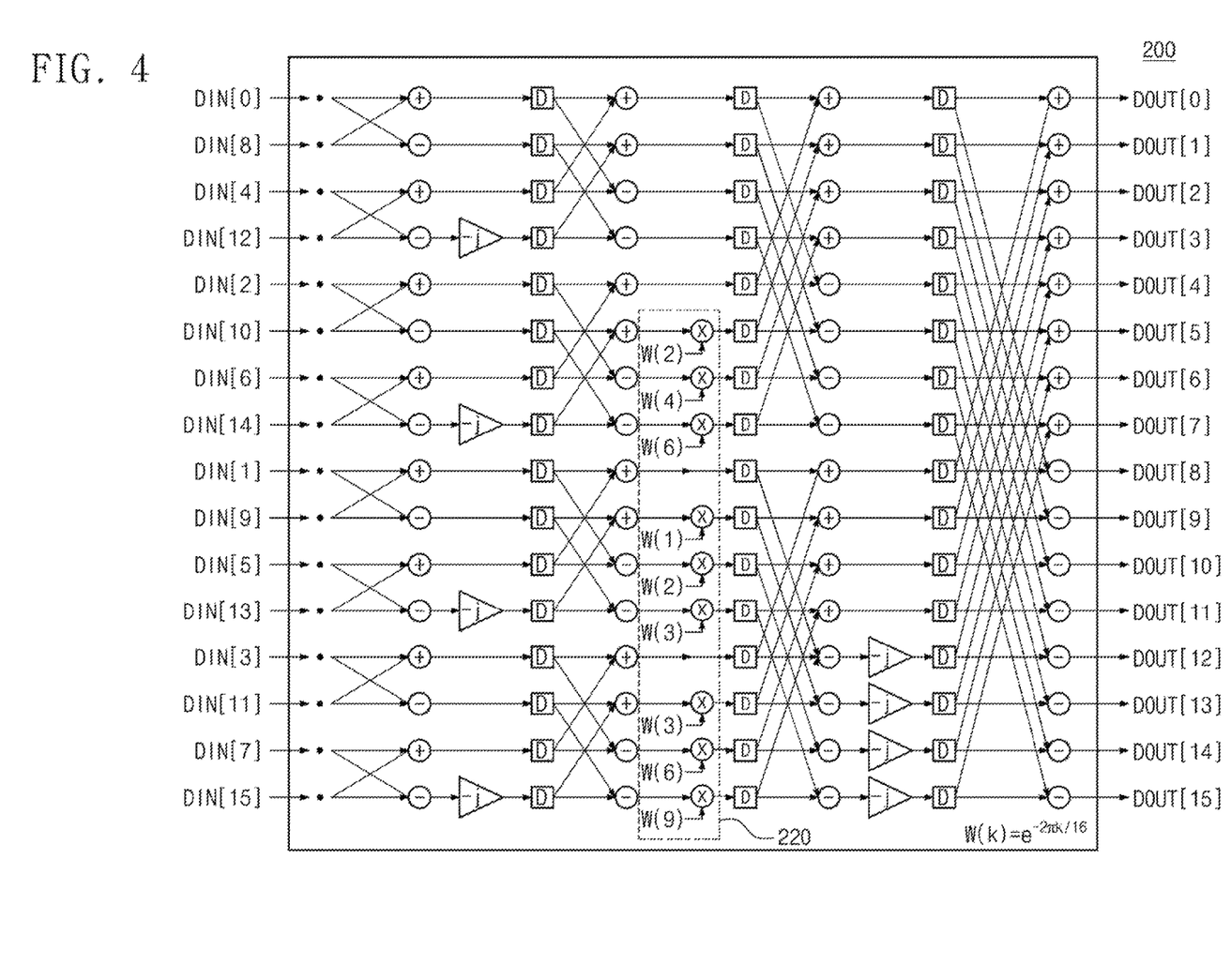
FIG. 4 illustrates an architecture of the radix-16 processor in FIG. 3.

FIG. 4 illustrates an architecture of the radix-16 processor in FIG. 3. Referring to FIG. 4, the architecture of the radix-16 processor 200 may be derived using the above-described Equation (3) and the signal flowchart of FIG. 2.

When 16 complex number samples DIN[0] to DIN[15] are input at the same time, the radix-16 processor 200 performs butterfly operations and complex number multiplying operations with twiddle factors. The complex number multipliers 220 perform complex number operations on twiddle factors W(1), W(2), W(3), W(4), W(6), and W(9). Here, the complex number multipliers 220 include 9 complex number multipliers as illustrated. In particular, among the complex number multipliers 220, one processing the twiddle factor W(4) has a phase shift of 180°. Accordingly, multiplication with the twiddle factor W(4) corresponds to a sign reversal for an imaginary part. A complex number multiplier for the twiddle factor W(4) may be realized to perform the complex number multiplying operation only with the sign inverter.

Accordingly, the radix-16 processor 200 may be substantially realized with 8 complex number multipliers. In addition, each stage of the radix-16 processor 200 may include 16 adders and consequently 64 adders may be used.

It was previously described that 8 complex number multipliers are used in the radix-16 processor 200. 4 typical multipliers are used for realizing one complex number multiplier. Accordingly, 32 typical multipliers (or constant multipliers) are necessary to realize 8 complex number multipliers. However, according to the following Equation (4), the number of typical multipliers for realizing 8 complex number multipliers may be reduced to 20.

$$X \cdot W(1) = (X_R + jX_I)(C - jA) = X_RC + X_IA + j(X_IC - X_RA) \quad (4)$$
$$= (X_R + X_I)A + (C - A)X_R + j\{(C + A)X_I - (X_R + X_I)A\};$$
$$X \cdot W(2) = (X_R + jX_I)(B - jB) = (X_R + X_I)B + j(X_I - X_R)B;$$
$$X \cdot W(3) = (X_R + jX_I)(A - jC) = X_RA + X_IC + j(X_IA - X_RC)$$
$$= (X_R + X_I)C - (C - A)X_R + j\{(C + A)X_I - (X_R + X_I)C\};$$
$$X \cdot W(2) = (X_R + jX_I)(B - jB) = (X_R + X_I)B + j(X_I - X_R)B;$$
$$X \cdot W(4) = (X_R + jX_I)(-j) = X_I + j(-X_R);$$
$$X \cdot W(6) = (X_R + jX_I)(-B - jB) = (X_I - X_R)B + j(-X_I - X_R)B;$$
$$X \cdot W(3) = (X_R + jX_I)(A - jC) = X_RA + X_IC + j(X_IA - X_RC)$$
$$= (X_R + X_I)C - (C - A)X_R + j\{(C + A)X_I - (X_R + X_I)C\};$$
$$X \cdot W(6) = (X_R + jX_I)(-B - jB) = (X_I - X_R)B + j(-X_I - X_R)B;$$
$$X \cdot W(9) = (X_R + jX_I)(-C + jA) = -X_RC - X_IA + j(X_RA - X_IC)$$
$$= -(C - A)X_R - (X_R + X_I)A + j\{(X_R + X_I) \cdot A - (C + A)X_I\}$$

where $X=(X_R+jX_I)$ and constants are approximate values such that A=sin(pi/8)=0.3827, B=sin(pi/4)=0.7071, C=cos (pi/8)=0.9239, D=cos(pi/8)+sin(pi/8)=1.3066, E=cos(pi/8)−sin(pi/8)=0.5412.

Referring to Equation (4), the number of typical multipliers used in complex number multiplications of X·W(1), X·W(2), X·W(3), X·W(4), X·W(6), and X·W(9) may be aggregated. Such calculation will be described with reference to FIGS. 6A to 6F.

Figure 5:
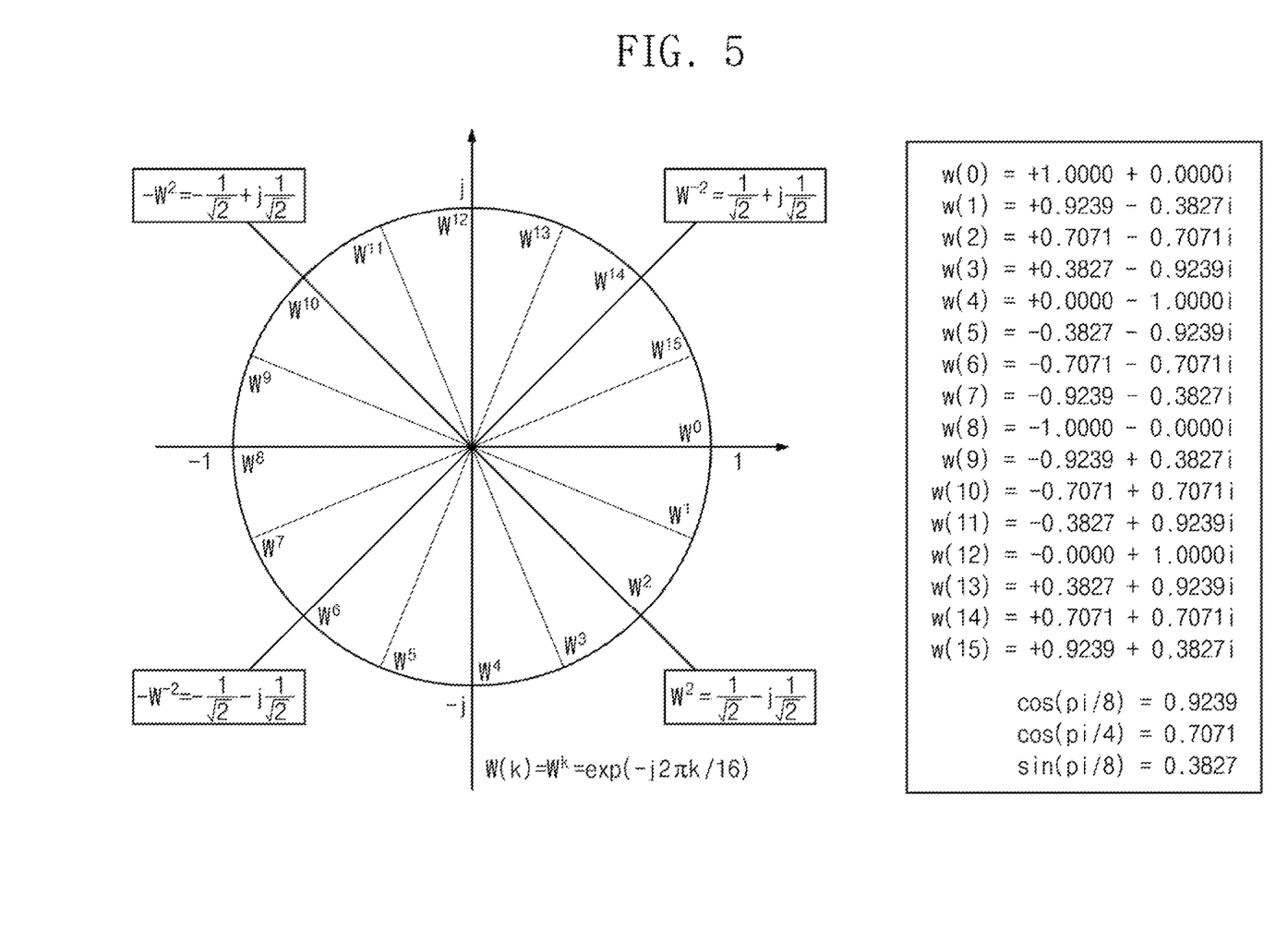
FIG. 5 illustrates a twiddle factor used in a radix-16 processor.

FIG. 5 illustrates a twiddle factor used in the radix-16 processor 200. Referring to FIG. 5, the magnitude of all twiddle factors is any one of 0.9239, 0.7071, and 0.3827. In addition, from among total 16 twiddle factors, twiddle factors actually used in the radix-16 processor 200 of the inventive concept are only W(1), W(2), W(3), W(4), W(6), and W(9). Accordingly, a complex signal input to the complex number multipliers as expressed in Equation (4) is defined as X and 5 types of constants are defined as A, B, C, D, and E. Then, when 9 complex number multiplications are deployed as in Equation (4), the number of typical multipliers may be reduced to total 20. Such characteristics will be described with reference to FIGS. 6A to 6F.

FIGS. 6A to 6F respectively illustrate complex number multipliers for the twiddle factors of the inventive concept.

Figure 6A:
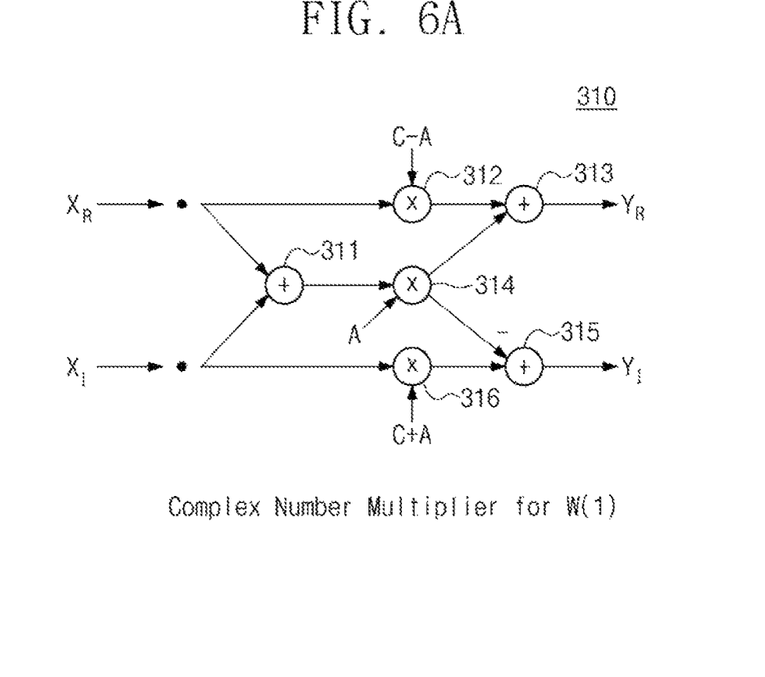
FIGS. 6A to 6F respectively illustrate complex number multipliers for the twiddle factors of the inventive concept.

FIG. 6A illustrates a complex number multiplier 310 for an input complex number X and a twiddle factor W(1). Referring to FIG. 6A, a complex number multiplier 310 is illustrated which performs complex number multiplication X·W(1). In Equation (4), a complex number multiplication equation for X·W(1) is expressed as $(X_R+X_I)A+(C-A)X_R+j\{(C+A)X_I-(X_R+X_I)A\}$. A result value of the complex number multiplication X·W(1) may be divided into a real part of '$Y_R=[(X_R+X_I)A+(C-A)X_R]$ and an imaginary part of $Y_I=[(C+A)X_I-(X_R+X_I)A]$. The complex number multiplier 310 for calculating X·W(1) may use 3 adders 311, 313, and 315 and 3 multipliers 312, 314, and 316.

Figure 6B:
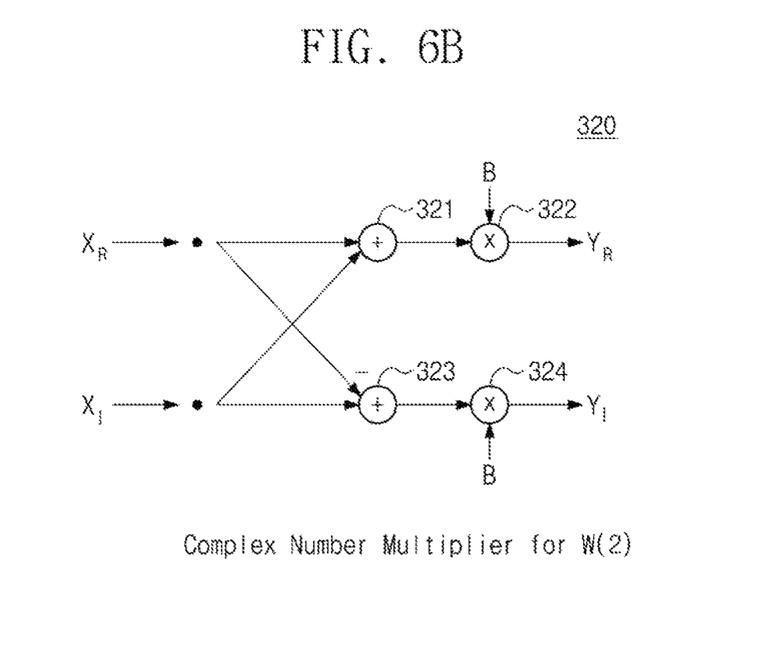

FIG. 6B illustrates a complex number multiplier 320 for an input complex number X and a twiddle factor W(2). Referring to FIG. 6B, an architecture of the complex number multiplier 320 is exemplarily illustrated which performs complex number multiplication X·W(2). In Equation (4), a complex number multiplication equation for X·W(2) is expressed as $(X_R+X_I)B+j(X_I-X_R)B$. A result value of the complex number multiplication may be arranged to a real part of $Y_R=(X_R+X_I)B$ and an imaginary part of $Y_I=(X_I-X_R)B$. Accordingly, the complex number multiplier 320 for calculating X·W(2) may use 2 adders 321 and 323 and 2 multipliers 322 and 324. Here, the two multipliers 322 and 324 may be realized with constant multipliers for multiplying each constant B.

Figure 6C:
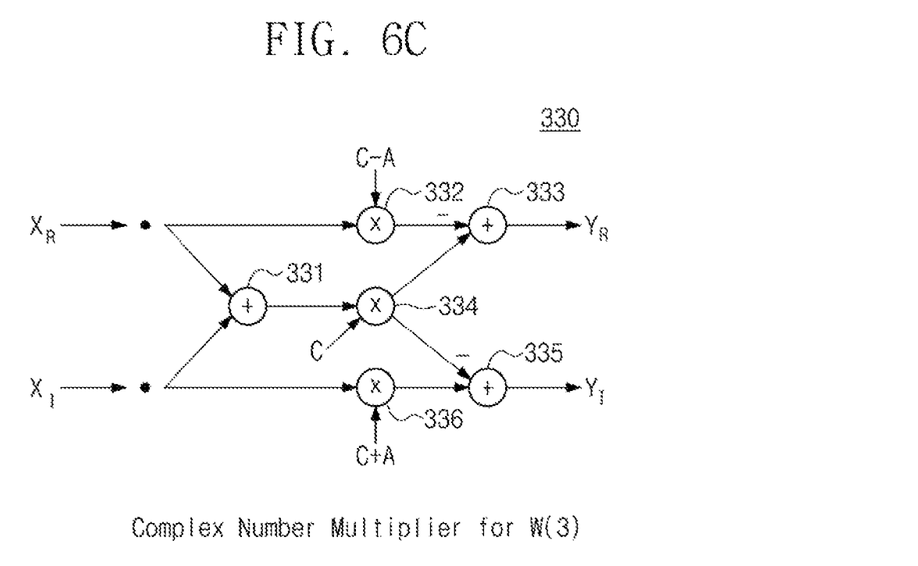

FIG. 6C illustrates a complex number multiplier 330 for an input complex number X and a twiddle factor W(3). Referring to FIG. 6C, an architecture of the complex number multiplier 330 is exemplarily illustrated which performs complex number multiplication X·W(3). In Equation (4), a complex number multiplication equation for X·W(3) is expressed as $(X_R+X_I)C-(C-A)X_R+j\{(C+A)X_I-(X_R+X_I)C\}$. A result value of the complex number multiplication X·W(3) may be arranged into a real part of $Y_R=[(X_R+X_I)C+(C-A)X_R]$ and an imaginary part of $Y_I=[(C+A)X_I-(X_R+X_I)C]$. Accordingly, the complex number multiplier 330 for calculating X·W(3) may use 3 adders 331, 333 and 335 and 3 multipliers 332, 334 and 336.

Figure 6D:
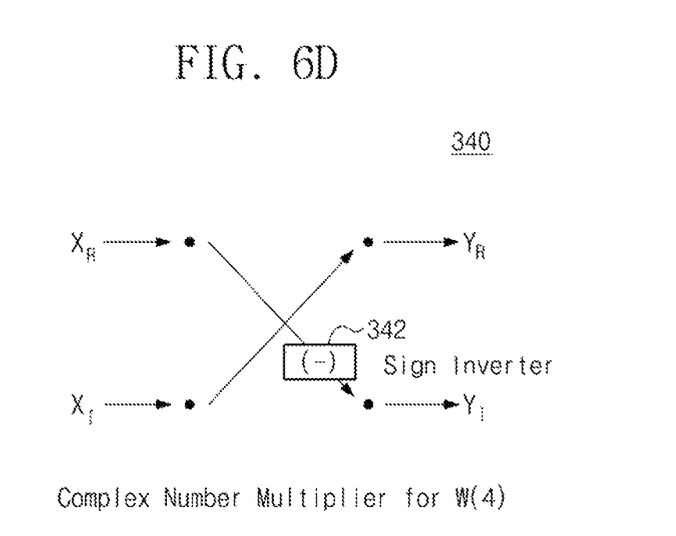

FIG. 6D illustrates a complex number multiplier 340 for an input complex number X and a twiddle factor W(4). Referring to FIG. 6D, an exemplary architecture of the complex number multiplier 340 is illustrated which performs complex number multiplication X·W(4). In Equation (4), a complex number multiplication equation for X·W(4) is expressed as $X_I+j(-X_R)$. A result value of the complex number multiplication X·W(4) may be arranged to a real part of $Y_R=X_I$ and an imaginary part of $Y_I=-X_R$. In other words, the complex number multiplier 340 for W(4) may be provided in an architecture in which an input real part $X_R$ is sign-inverted and then the real part and imaginary part are exchanged to each other to be output. Accordingly, the complex number multiplier 340 for calculating $X \cdot W(4)$ requires only one sign inverter 342.

Figure 6E:
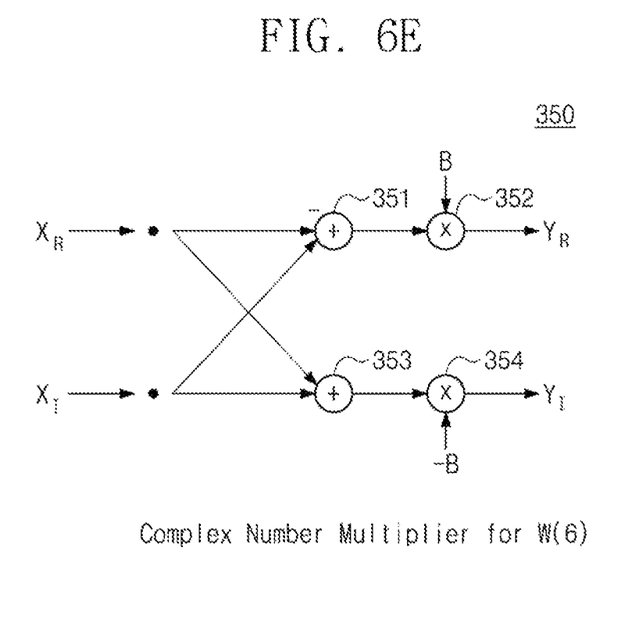

FIG. 6E illustrates a complex number multiplier 350 for an input complex number X and a twiddle factor $W(6)$. Referring to FIG. 6E, an architecture of the complex number multiplier 350 is exemplarily illustrated which performs complex number multiplication $X \cdot W(6)$. In Equation (4), a complex number multiplication equation for $X \cdot W(6)$ is expressed as $(X_R+X_I)B+j(-X_I-X_R)B$. Here, a result value of the complex number multiplication may be arranged to a real part of $Y_R=(X_I-X_R)B$ and an imaginary part of $Y_1=(-X_I-X_R)B$. Accordingly, the complex number multiplier 350 for calculating $X \cdot W(6)$ may include 2 adders 351 and 353 and 2 multipliers 352 and 354.

Figure 6F:
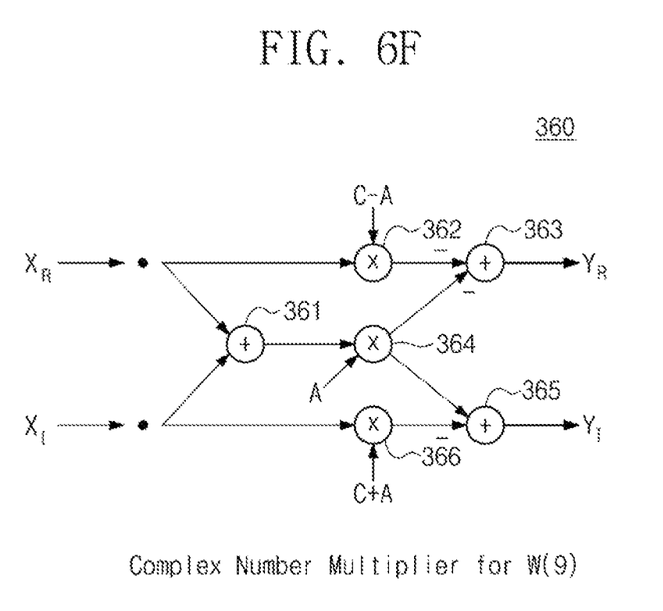

FIG. 6F illustrates a complex number multiplier 360 for an input complex number X and a twiddle factor $W(9)$. Referring to FIG. 6F, an architecture of the complex number multiplier 360 is exemplarily illustrated which performs complex number multiplication $X \cdot W(9)$. In Equation (4), a multiplication equation for $X \cdot W(9)$ is expressed as $-(C-A)X_R-(X_R+X_I)A+j\{(X_R+X_I)A-(C+A)X_I\}$. A result value of the complex number multiplication $X \cdot W(9)$ may be arranged into a real part of $Y_R=-(C-A)X_R-(X_R+X_I)A$ and an imaginary part of $Y_I=\{(X_R+X_I)A-(C+A)X_I\}$. Accordingly, the complex number multiplier 360 for calculating $X \cdot W(9)$ may include 3 adders 361, 363 and 365 and 3 multipliers 362, 364 and 366.

Hereinbefore, configurations of complex number multipliers for twiddle factors used for the radix-16 processor 200 (see FIG. 4) of the inventive concept has been described. Consequently, the complex number multipliers 310, 320, 330, 340, 350, and 360 for total 6 types of twiddle factors may be used. In addition, there are three types of constant multipliers used for forming the above-described complex multipliers 310, 320, 330, 340, 350, and 360. In other words, multipliers for constants {C-A, C+A, and B} are realizable only with shifters and adders using a canonical signed digit (CSD) method. Accordingly, types of the multipliers used in the radix-16 processor 200 may be compressed into 3 types. In addition, each of the twiddle factor multipliers {$X \cdot W(1)$, $X \cdot W(3)$, $X \cdot W(9)$} is realized with 3 typical multipliers and each of the twiddle factor multipliers {$X \cdot W(2)$, $X \cdot W(6)$} includes two typical multipliers. Among the twiddle factor multipliers used in the radix-16 processor 200 described in relation to FIG. 4, {$X \cdot W(2)$, $X \cdot W(3)$, $X \cdot W(6)$} are simultaneously used at two points. Accordingly, the number of typical multipliers simultaneously used for forming the radix-16 processor 200 as shown in FIG. 4 may be 20.

Hereinbefore, the architecture of the radix-16 processor according to the modified radix-16 FFT algorithm according to an embodiment of the inventive concept has been described. A method has been proposed which may classify types of multipliers used in the radix-16 processor of the inventive concept and then reduce the number of multipliers. For realizing a fully parallel fast Fourier transformer for processing 256 samples, 32 radix-16 processors are required to be used. In addition, it has been proved that the number of constant multipliers, for example, 20 for executing complex number multiplication may be dramatically reduced in each radix-16 processor. Each of 32 radix-16 processors used in the fully parallel fast Fourier transformer 200 of the inventive concept may be realized with 20 multipliers. Accordingly, the number of multipliers used for realizing 32 radix-16 processors may be considered as 640. In addition, the number of multipliers used in the twiddle factor multiplying block 133 may be considered as 668. Accordingly, the total number of multipliers used in the fully parallel fast Fourier transformer 200 of the inventive concept may be aggregated to 1308. Such reduction in number of multipliers may dramatically reduce a hardware cost of the fully parallel fast Fourier transformer 200 and contribute to remarkably reduce the size thereof.

According to a fast Fourier transformer according to embodiments of the inventive concept may minimize the use of complex number multipliers occupying a large part of hardware and realize 25G sample rate per second or higher. Accordingly a hardware cost may be greatly reduced in an optical OFDM transmitter/receiver.

In addition, the FFT processor architecture presented in the present disclosure may be applied to FFT processors having various lengths of 32, 64, 128, 512, 1024, and 2048 as well as a 256-point FFT. The FFT processor of such an architecture may be widely used for various signal processing application fields requiring super high speed processing as well as for optical OFDM communication.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A fully parallel fast Fourier transformer of N-point, where N is a natural number, the fully parallel fast Fourier transformer comprising:
    a bit-reversal arranging block configured to rearrange, according to a bit-reversal permutation, an order of N input complex number samples;
    a plurality of first processors configured to perform, in a plurality of group units, a 16-point fast Fourier transform (FFT) on the rearranged complex number samples;
    a twiddle factor multiplier configured to multiply outputs of the plurality of first processors by respective twiddle factors to produce corresponding twiddled outputs of the plurality of first processors;
    a first group rearranging block configured to rearrange the twiddled outputs of the twiddle factor multiplier in the plurality of group units, so that for each twiddled output corresponding to an $i^{th}$ output of a $j^{th}$ first processor, the twiddled output is grouped into a $j^{th}$ element of an $i^{th}$ group unit of an output of the first group rearranging block;
    a plurality of second processors configured to perform, in the plurality of group units, 16-point FFT on the complex number samples grouped by the first group rearranging block; and
    a second group rearranging block configured to rearrange outputs of the plurality of second processors so that for each output of the plurality of second processors, a $k^{th}$ output of an $m^{th}$ second processor corresponds to an $m^{th}$ output of a $k^{th}$ group unit of the output of the second group rearranging block,
    wherein the $m^{th}$ output of a $k^{th}$ group unit of the second group rearranging block corresponds to an output DOUT[n] of the fully parallel fast Fourier transformer, n=(m−1)+16(k−1).

2. The fully parallel fast Fourier transformer of claim 1, wherein the bit-reversal arranging block allocates an order of the N input complex number samples but rearranges the order in a manner that a bit position of a binary value of the order is switched.

3. The fully parallel fast Fourier transformer of claim 1, wherein the plurality of first processors and the plurality of second processors comprise radix-16 processors configured to perform an FFT operation on the input complex number samples in the plurality of group units.

4. The fully parallel fast Fourier transformer of claim 3, wherein the plurality of first processors and the plurality of second processors respectively 16 radix-16 processors.

5. The fully parallel fast Fourier transformer of claim 1, wherein radix-16 processors included in the plurality of first processors or the plurality of second processors use twiddle factors of W(1), W(2), W(3), W(4), W(6), and W(9) among 16 twiddle factors in complex number multiplication.

6. The fully parallel fast Fourier transformer of claim 5, wherein the radix-16 processor comprises 9 complex number multipliers configured to perform complex multiplication operations on the twiddle factors of W(1), W(2), W(3), W(4), W(6), and W(9) and the complex number multiplier for the twiddle factor of W(4) is realized through a sign inversion operation.

7. The fully parallel fast Fourier transformer of claim 5, wherein for a multiplication operation for each of the twiddle factors of W(1), W(3), and W(9), 3 adders and 3 constant multipliers are used.

8. The fully parallel fast Fourier transformer of claim 5, wherein for a multiplication operation for each of the twiddle factors of W(2) and W(6), 2 adders and 2 constant multipliers are used.

9. The fully parallel fast Fourier transformer of claim 5, wherein the radix-16 processor comprises 20 constant multipliers configured to perform complex number multiplication of the twiddle factors.

10. The fully parallel fast Fourier transformer of claim 9, wherein the constant multiplier comprises a canonical signed digit (CSD) multiplier realized with shifters and adders.

11. The fully parallel fast Fourier transformer of claim 1, wherein at least one of the bit-reversal arranging block, the first group rearranging block, or the second group rearranging block is formed in an interconnection manner without a memory.

12. The fully parallel fast Fourier transformer of claim 1, wherein the point number N corresponds to any one length of 32, 64, 128, 256, 512, 1024, and 2048.

* * * * *